(12) United States Patent
Shiotani

(10) Patent No.: US 8,132,336 B2
(45) Date of Patent: Mar. 13, 2012

(54) DEVICE AND METHOD FOR DRYING SYNTHETIC RESIN PELLET

(75) Inventor: Yousuke Shiotani, Komaki (JP)

(73) Assignee: Star-Techno Co., Ltd., Nagoya-Shi (JP)

( * ) Notice: Subject to any disclaimer, the term of this patent is extended or adjusted under 35 U.S.C. 154(b) by 507 days.

(21) Appl. No.: 12/367,651

(22) Filed: Feb. 9, 2009

(65) Prior Publication Data

US 2010/0154249 A1    Jun. 24, 2010

(30) Foreign Application Priority Data

Dec. 22, 2008    (JP) ................. 2008-325972

(51) Int. Cl.
     *F26B 3/02*      (2006.01)
     *F26B 25/00*      (2006.01)
     *F26B 25/06*      (2006.01)

(52) U.S. Cl. ............. 34/92; 34/216; 34/217; 34/218; 34/236

(58) Field of Classification Search .......... 34/92, 184, 34/187, 201, 202, 209, 210, 215, 216, 217, 34/218, 236, 498

See application file for complete search history.

(56) References Cited

U.S. PATENT DOCUMENTS 4,290,908 A * 9/1981 Horiuchi et al. ............. 34/77

FOREIGN PATENT DOCUMENTS

| JP | 2001-150436 A | 6/2001 |
|---|---|---|
| JP | 2005-238691 A | 9/2005 |
| JP | 2006-056188 A | 3/2006 |
| JP | 2007-045080 A | 2/2007 |
| JP | 2007-083594 A | 4/2007 |

* cited by examiner

*Primary Examiner* — Jiping Lu

(74) *Attorney, Agent, or Firm* — Holtz, Holtz, Goodman & Chick, PC

(57) ABSTRACT

Resin molding work is efficiently carried out in accordance with a consumption amount of resin pellets of a resin molding machine by sequentially supplying small amounts of dried resin pellets in short period of time. When changeover of a molded product is carried out, attached remaining resin pellets can be removed by simple work in a short period of time, thereby carrying out efficient changeover work. An interval of taking out dried resin pellets that are heated and dried in a decompressed state is shortened by sequentially moving a plurality of pellet containers that contain small amounts of resin pellets.

6 Claims, 1 Drawing Sheet

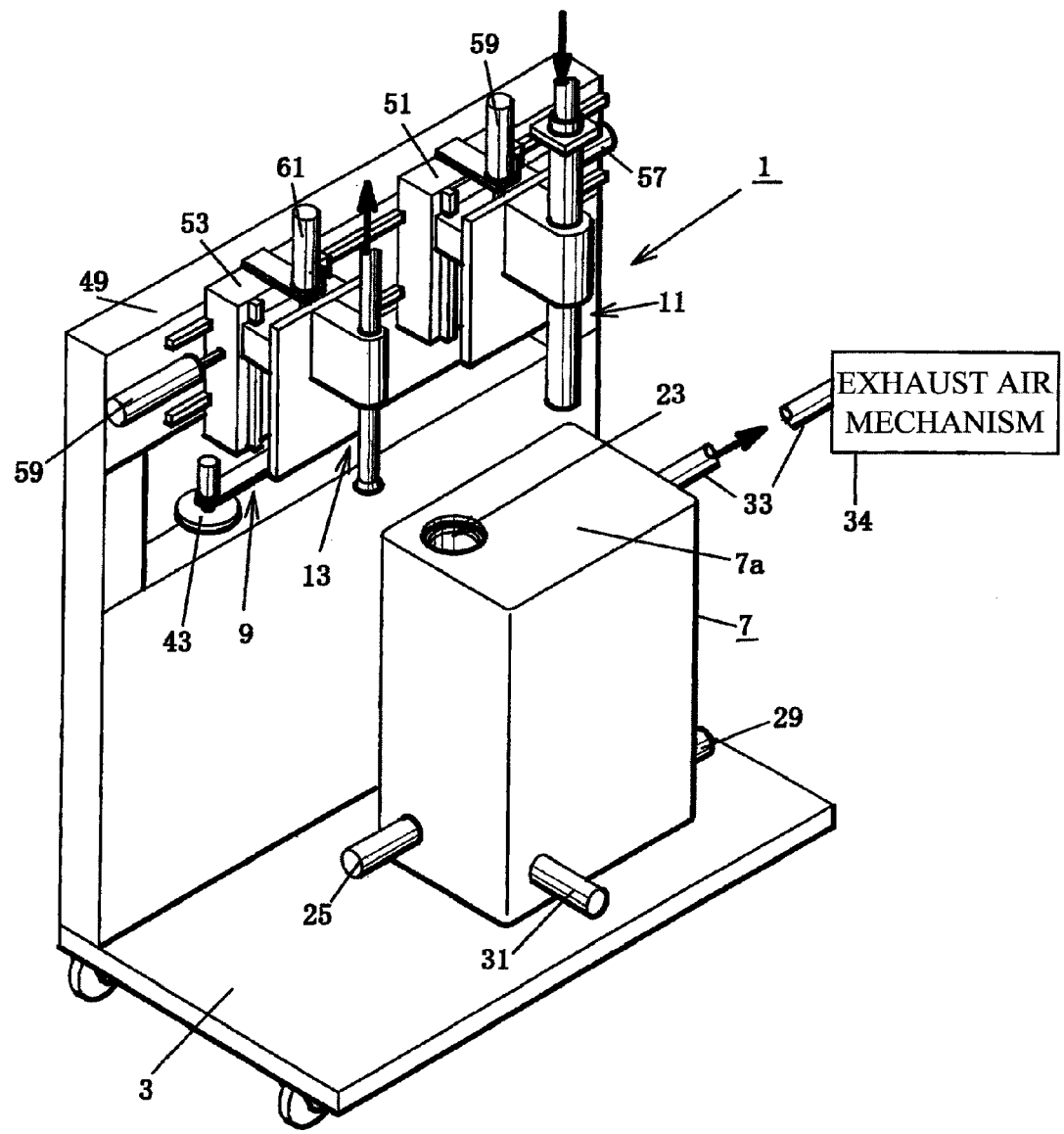

DEVICE AND METHOD FOR DRYING SYNTHETIC RESIN PELLET

BACKGROUND OF THE INVENTION

1. Field of the Invention

The present invention relates to a device and a method for drying a synthetic resin pellet that dry and remove water attached to and bound water contained in a synthetic pellet (hereinafter referred to as a resin pellet) that is a molding raw material of a resin molding machine.

2. Description of the Related Art

With respect to a resin pellet dryer that dries and removes water attached to and bound water contained in a surface of a resin pellet supplied as a molding raw material to a resin molding machine, there is one described, for example, in Patent Document 1 (Jpn. Pat. Appln. Laid-Open Publication No. 2005-238691) The disclosed technique includes a pellet containing member, a screw feeder, a vacuum drawing means, a heater, an opening and closing section on an introduction side, an opening and closing section on a discharge side, three operation control sections, and a controller. The pellet containing member is formed by a tube that is disposed in a horizontal state. The screw feeder is disposed in the tube that forms the pellet containing member, and rotationally driven by an electric motor. The vacuum drawing means keeps the inside of the pellet containing member to be in a predetermined vacuum pressure state. The heater is provided in the tube, and keeps the inside of the pellet containing member at a predetermined temperature. The opening and closing section on an introduction side is provided in a pellet introduction section formed on a first end section side of the tube, and driven by a predetermined actuator. The opening and closing section on a discharge side is provided in a pellet discharge section formed on a second end section side of the tube, and driven by a predetermined actuator. The three of the operation control sections control the actuator, the electric motor, and the vacuum drawing means, respectively. The controller carries out temperature control of the heater.

In a resin pellet dryer of the above kind, the water and the bound water are dried and removed in a manner that a required amount of resin pellets are put at once into the pellet containing member having capacity corresponding to an amount of resin pellets consumed by the resin molding machine, and then the inside of the pellet containing member is heated while being evacuated. For this reason, the resin pellet drying device that is used for the resin molding machine that molds a resin molded product of large size needs the pellet containing member of large capacity that contains a large amount of resin pellets. Accordingly, size of the drier itself becomes large and drying time becomes longer, and there is a problem that an enough amount of resin pellets cannot be dried in accordance with an amount of resin pellets consumed by the resin molding machine.

In addition, when a molded product to be molded is changed, a type of resin pellets to be dried needs to be changed. Then, when the resin pellets to be dried are changed, remaining pellets before the change that are attached to the inside of the pellet containing member, the screw feeder, and the like need to be completely removed in order to avoid the resin pellets before the change mixing with those after the change. In order to remove the remaining resin pellets, the remaining resin pellets attached to the pellet containing member and the screw feeder need to be removed after an end section of the pellet containing member is opened and the screw feeder in the inside is taken out. This work is troublesome and changeover time takes long time, and there is a problem that a molding efficiency is lowered.

A problem to be solved is that a long period of time is required for drying a large amount of undried resin pellets at once, a consumption amount of resin pellets of the resin molding machine and a drying amount do not match with each other, and resin molding work cannot be carried out efficiently. Also, there is a problem to be solved that, when changeover of a molded product is carried out, a large amount of work and a long period of time are required for completely removing remaining resin pellets attached to a variety of members that constitute the drier of resin pellets, and the changeover work cannot be carried out efficiently.

SUMMARY OF THE INVENTION

According to an aspect of the present invention, there is provided a synthetic resin pellet drying device that includes: a plurality of pellet containers that have a required length in a vertical direction, have a hollow section with a bottom surface, and contain a predetermined amount of synthetic resin pellets; a drying box that can contain the plurality of pellet containers in a state where the pellet containers are adjacent to each other and supported in a movable manner, has a heating member provided at least on an inner surface, has a suction hole that communicates with atmospheric air and allows air to flow into the inside, and has an opening section that is leveled with a top end of the pellet containers on part of a top plate; a moving member that sequentially moves the pellet containers contained in the drying box so as to circulate the pellet containers; an exhausting means for exhausting air in the drying box to form a required decompressed state; a lid that opens and closes the opening section on the top plate of the drying box; a pellet supplying means for supplying undried synthetic resin pellets in the pellet container through the opened opening section; and a pellet take-out means for taking out synthetic resin pellets in a dried state that are contained in the pellet container through the opened opening section.

In addition, according to another aspect of the present invention, there is provided a synthetic resin pellet drying method for heating and drying undried synthetic resin pellets in a decompressed state, including: circulating and turning a plurality of pellet containers that contain a predetermined amount of synthetic resin pellets in a state where the pellet containers are contained in a drying box in a manner adjacent to each other; supplying a predetermined amount of undried synthetic resin pellets in the pellet containers by a pellet supplying means through an opening section of the drying box when the pellet container that does not contain synthetic resin pellets is positioned at the opening section, and then heating and drying the contained synthetic resin pellets in a decompressed state by moving the pellet containers sequentially; and taking out a predetermined amount of dried synthetic resin pellets by a pellet take-out means through the opening section when the pellet container containing synthetic resin pellets that are dried along the movement is positioned at the opening section.

The present invention enables efficient resin molding work in accordance with a consumption amount of resin pellets of a resin molding machine by supplying a small amount of dried resin pellets in a short period of time sequentially. Also, when changeover of a molded product is carried out, attached remaining resin pellets can be removed by simple work in a short period of time, thereby enabling efficient changeover work.

BRIEF DESCRIPTION OF THE DRAWINGS

FIG. 1 is a perspective view showing an outline of a resin pellet drying device according to the present invention;

FIG. 2 is a front view of the resin pellet drying device;

FIG. 3 is a plan view of the resin pellet drying device;

FIG. 4 is a traverse section explanatory view showing a state of containing pellet containers in a drying box;

FIG. 5 is a partial longitudinal section explanatory view of a location corresponding to an opening section of the drying box;

FIG. 6 is an explanatory view showing a moving state of the pellet containers with respect to the opening section;

FIG. 7 is an explanatory view showing a state of supplying undried resin pellets to the pellet container;

FIG. 8 is an explanatory view showing a closed state of the opening section;

FIG. 9 is an explanatory view showing a state of sucking dried resin pellets;

FIG. 10 is an explanatory view showing a state of taking out a suction tube from the pellet container; and FIG. 11 is an explanatory view showing a state of mounting the drying box and the pellet containers in a second example.

DETAILED DESCRIPTION OF THE PREFERRED EMBODIMENTS

A preferred embodiment of the present invention shortens an interval of taking out dried resin pellets that are heated and dried in a decompressed state by sequentially moving a plurality of pellet containers that contain small amounts of resin pellets.

First Example

Hereinafter, the present invention will be described with reference to the accompanying drawings that illustrate embodiments.

As shown in FIGS. 1 to 5, a main frame 3 of a resin pellet drying device 1 includes a drying box 7, a lid mounting mechanism 9, a resin pellet supply mechanism 11, a resin pellet suction/take-out mechanism 13, and an exhaust air mechanism 34. The drying box 7 includes an odd number (seven in the present example) of pellet containers 5 that are arranged in two columns in a standing state and contained in a manner movable in a column direction and a row direction. The lid mounting mechanism 9 closes an opening section formed on a column side end section on a top surface of the drying box 7. The resin pellet supply mechanism 11 supplies resin pellets to be dried to the pellet containers 5. The resin pellet suction/take-out mechanism 13 sucks in and takes out dried resin pellets from the pellet containers 5. The exhaust air mechanism 34 exhausts air in the inside of the drying box 7 for decompression. The resin pellet suction/take-out mechanism 13 is connected to a negative pressure generation device (not shown), such as a vacuum pump and an air blower.

A flat heating member 17, such as an electric heater, is mounted on an entire face of an inner surface and a bottom surface of the drying box 7. In addition, a flat heating member 19, such as an electric heater, having a length equal to two of the pellet containers 5 in a longitudinal direction and a height equal to that of the drying box 7 is mounted in a standing state on an intermediate section between columns in the drying box 7. The flat heating members 17 and 19 are configured to heat the pellet containers 5 to a predetermined temperature in the vicinity of a side face and a bottom face of each of the pellet containers 5. Further, a heat insulating material 21, such as glass wool, is mounted on an external surface of the drying box 7 to cover an entire surface, except for an opening section 23 that is described later. For convenience of description, a left column shown in FIG. 4 is set as a first column and a right column is set as a second column, and a first row, a second row, a third row, and a fourth row are set in this order from the bottom to the top. The flat heating member 17 provided in the drying box 7 may be mounted on an external surface of the drying box 7.

A first moving member 25, such as an electric motor having a feed screw and an air cylinder with an axis line having a length equal to that of one pellet container 5, that has an axis line directed in the first column direction is mounted in the first column and the first row in the drying box 7. A second moving member 27, such as an air cylinder with an axis line having a length equal to that of one pellet container 5, that has an axis line directed in the fourth row direction is mounted in the first column and the fourth row in the drying box 7. A third moving member 29, such as an air cylinder with an axis line having a length equal to that of one pellet container 5, that has an axis line directed in the second column direction is mounted in the second column and the fourth row in the drying box 7. Similarly, a fourth moving member 31, such as an air cylinder with an axis line having a length equal to that of one pellet container 5, that has an axis line directed in the first row direction is mounted in the second column and the first row in the drying box 7. The first to fourth moving members 25, 27, 29, and 31 move the pellet containers 5 by pressing the pellet containers 5 in the respective axis line directions.

A top plate 7a is mounted on a top surface of the drying box 7 in a detachable manner. The opening section 23 that is equal in size with a top end opening section of the pellet container 5 described later and has a locking section along the circumferential edge thereof is formed at a position corresponding to the first column and the first row on the top plate 7a. Therefore, the top surface of the drying box 7 corresponding to the other column positions and row positions are covered by the top surface plate. The heat insulating material 21 may be provided on a top surface of the top plate 7a excluding the opening section 23 to improve thermal insulation effect.

For example, an exhaust pipe 33 extending from the exhaust air mechanism 34 is connected to a top section of the drying box 7 at a position between the first column and the second column in the fourth row. The exhaust air mechanism 34 includes a vacuum pump, and exhausts air in the drying box 7 via the exhaust pipe 33. In addition, a plurality of suction holes (not shown) 7b are formed on a bottom surface of the drying box 7 corresponding to all column positions and row plates except the position corresponding to the first column and the first row. The suction holes 7b set the inside of the drying box 7 in a predetermined decompressed state by allowing a minute amount of air to flow into the drying box 7 and exhausting air by the exhaust air mechanism 34.

Each of the pellet containers 5 has a closed bottom and an opened top, and a rectangular tube shape with a height substantially equal to that of the drying box 7. The suction tube 35 that has opened top and bottom ends and has a cylindrical shape with a length little bit shorter than that of the pellet containers 5 is mounted in a center section of a hollow section of each of the pellet containers 5, in a manner that the top end is leveled with that of the pellet containers 5. Accordingly, a small gap is provided between the bottom surface of each of the pellet containers 5 and the bottom end of the suction tube 35. A rib 35a provided on the circumference of the suction tube 35 in a manner extending in a radial direction is provided with a hollow section 35b that extends from a top section to a bottom section of each of the pellet containers 5. The hollow section 35b introduces air to the bottom section of each of the pellet containers 5 when resin pellets that are dried in the pellet containers 5 as described later are sucked in and taken out, so as to improve a suction effect. The suction tube 35 is mounted in a detachable manner with an end section in a radial direction of the rib 35*a* being engaged with a concave section 5*a* that is provided on an inner surface of each of the pellet containers 5.

The lid mounting mechanism 9 is provided on a rear standing wall of the main frame 3. The lid mounting mechanism 9 includes a turning member 37, a turning arm 39, a vertical motion member 41, and a lid 43. The turning member 37, such as an air motor and an electric motor, is fixed on the rear standing wall of the main frame 3 having an axis line of the turning member 37 in a vertical direction. The turning arm 39 has a base end section thereof fixed on a rotational axis of the turning member 37, and a length that allows the turning arm 39 to extend to a position above the opening section 23 of the drying box 7. The vertical motion member 41, such as an air cylinder, is mounted on a tip section of the turning arm 39 and has an axis line in a vertical direction. The lid 43 is fixed on a rod of the vertical motion member 41 and to be inserted and fitted in the opening section 23.

When resin pellets contained in the pellet containers 5 of the drying box 7 are vacuum-dried, the lid mounting mechanism 9 turns the turning arm 39 by drive of the turning member 37 to move the lid 43 to a position above the opening section 23. Then, the lid mounting mechanism 9 operates the vertical motion member 41 to allow the lid 43 to move down to be inserted and fitted in the opening section 23 so as to close the opening section 23. On the other hand, when any of the pellet containers 5 containing the dried resin pellets is moved to a position of the first column and the first row of the drying box 7, the lid mounting mechanism 9 operates the vertical motion member 41 to move the lid 43 upwardly to open the opening section 23. Then, the lid mounting mechanism 9 reversely drives the turning member 37 to turn the turning arm 39 to a stand-by position side, so that the lid 43 is in a stand-by state on a rear side of the main frame 3. When a moving distance of the lid 43 toward the opening section 23 is short, the opening section 23 can be closed by the lid 43 that is suctioned by the inside of the drying box 7 that is formed in negative pressure, without vertically moving the lid 43 using the vertical motion member 41. In this case, the lid 43 only needs to be elastically supported by a compression spring and the like on a tip section of the turning arm 39.

A carrier frame 49 that extends in a longitudinal direction is provided on the rear standing wall of the main frame 3. The carrier frame 49 supports a first and a second carrier bodies 51 and 53 in a manner that the first and the second carrier bodies 51 and 53 move in the longitudinal direction independently. The first and the second carrier bodies 51 and 53 are connected to a first and a second drive members 55 and 57, such as an air cylinder and a feed screw connected to an electric motor (FIGS. 1 to 3 show the drive members that are constituted by air cylinders) The first and the second carrier bodies 51 and 53 are moved to be positioned above the opening section 23 on the drying box 7 by drive of the drive members 55 and 57.

The first carrier body 51 is provided with the resin pellet supply mechanism 11 having an axis line in a vertical direction in a manner that the resin pellet supply mechanism 11 can move in the vertical direction by a predetermined stroke. The resin pellet supply mechanism 11 moves up and down a supply port thereof in accordance with operation of a first operation member 59, such as an air cylinder. The supply port is moved up and down between a position close to an opening on a top end of any of the pellet containers 5, except for the suction tube 35, that is positioned at the first column and the first row in the drying box 7 and a position apart from the opening.

The second carrier body 53 is provided with the resin pellet suction/take-out mechanism 13 having an axis line in a vertical direction in a manner that the resin pellet suction/take-out mechanism 13 can move in the vertical direction by a predetermined stroke. The resin pellet supply mechanism 11 moves up and down a suction port thereof in accordance with operation of a second operation member 61, such as an air cylinder. The suction port is moved up and down between a position where the suction port is pressed against a top end of the suction tube 35 of the pellet containers 5 that is positioned at the first column and the first row in the drying box 7 and a position apart from the top end.

Next, description will be made with respect to action and a method of drying resin pellets in the resin pellet drying device 1 having the above configuration. Seven pellet containers 5 are contained in the drying box 7 and arranged continuously in two columns and four rows with space of size of one pellet container 5 in the middle. For example, the space of size of one pellet container 5 is assumed to be set at the first column and the first row. Also, illustration of the rib 35*a* having the hollow section 35*b* provided on the outer circumference of the suction tube 35 is omitted in FIGS. 7 to 9 for convenience of description.

One of the pellet containers 5 positioned in the second column and the first row is moved to the position of the first column and the first row by operating the fourth moving member 31 in the above state. Also, one of the pellet containers 5 positioned in the second column and the fourth row is pushed to a lower row side of the second column by operating the third moving member 29. Further, one of the pellet containers 5 positioned in the first column and the fourth row is pushed to a side of the second column and the fourth row by operating the second moving member 27 (refer to FIG. 6).

Next, in the above state, the first drive member 55 is operated to move the resin pellet supply mechanism 11 to a position above the opening section 23 of the drying box 7. Then, the first operation member 59 is operated to move a lower end of the supply port of the resin pellet supply mechanism 11 close to an opening on a top end of one of the pellet containers 5, except for the suction tube 35, that is moved to the first column and the first row of the drying box 7 corresponding to the opening section 23. In this state, a supply nozzle of the resin pellet supply mechanism 11 is opened, and a predetermined amount of resin pellets are supplied to and contained in a space section positioned around the suction tube 35 of one of the pellet containers 5. After the above operation, the first drive member 55 and the first operation member 59 are driven reversely, and the resin pellet supply mechanism 11 is returned to an original position. (Refer to FIG. 7)

Next, the turning member 37 is driven to turn the turning arm 39 so that a tip section thereof is positioned above the opening section 23 of the drying box 7. Then, the vertical motion member 41 is operated to allow the lid 43 to be inserted and fitted in the opening section 23, so that the opening section 23 is closed. After the above operation, or before the above operation, the first moving member 25 is operated to push one of the pellet containers 5 positioned in the first column and the first row toward an upper row in the first column. In this manner, the pellet containers 5 positioned in the first column are moved. (Refer to FIG. 8)

In the above state, the Inside of the drying box 7 is formed to be in a required decompressed state in a manner that the exhaust mechanism driven in a state, where the suction holes allow air to flow in, exhausts air in the inside. Also, the pellet containers 5 in the drying box 7 are heated to a temperature, at which resin pellets contained in the pellet containers 5 are not melted, by the flat heating members 17 and 19 that are in contact with or in the vicinity of the pellet containers 5. In this manner, the resin pellets contained in the pellet containers 5 are heated in a decompressed state, where a boiling point is lowered than that under atmosphere pressure, and dried when water attached to and bound water contained in the resin pellets are vaporized and exhausted.

Next, when a predetermined period of time passes, one of the pellet containers 5 positioned in the second column and the first row is moved to the first column and the first row by operating the fourth moving member 31, one of the pellet containers 5 positioned in the second column and the fourth row is moved to a lower row side by operating the third moving member 29, and one of the pellet containers 5 positioned in the first column and the fourth row is moved to the second column and the fourth row by operating the second moving member 27, as described above.

Then, as described above, when one of the pellet containers 5 is moved to the first column and the first row of the drying box 7, the opening section 23 is opened in a manner that the lid 43 is dismounted from the opening section 23 by reversely driving the vertical motion member 41 first, and the turning member 37 is reversely driven to return the turning arm 39 to an original position to stand-by. Then, in a similar manner as described above, a lower end of the supply nozzle is moved close to the opening of the top end of one of the pellet containers 5 positioned in the first column and the first row by moving the resin pellet supply mechanism 11 to the opening section 23. Then, the supply nozzle is opened and a predetermined amount of resin pellets are supplied and contained in the pellet container 5.

After the above operation, in a similar manner as described above, the resin pellet supply mechanism 11 is returned to the original position, and the lid 43 is inserted and fitted in the opening section 23 so that the opening section 23 is closed. The predetermined period of time described above is set to a period of time obtained by dividing time required for drying all undried resin pellets contained in all seven pellet containers 5 by the number of the pellet containers 5.

Undried resin pellets contained in the pellet containers 5 are vacuum-heated and dried by a sequential movement at predetermined time intervals, by repeating the above operation. Then, when, for example, one of the pellet containers 5, in which undried resin pellets are contained and vacuum-dried first, is positioned in the first column and the first row of the drying box 7 in accordance with the sequential movement by operation of the first to the fourth moving members 25, 27, 29, and 31, the lid 43 is first dismounted from the opening section 23. Then, the second drive member 57 is driven to move the resin pellet suction/take-out mechanism 13 to a position above the opening section 23. Next, the second operation member 61 is operated to press the suction hole against a top end of the suction tube 35. (Refer to FIG. 9)

In this state, the negative pressure generation device connected to the resin pellet suction/take-out mechanism 13 is driven, and the resin pellets in a dried state contained between the suction tube 35 and an inner surface of the pellet container 5 are sucked in and taken out through the suction tube 35. At this time, the hollow section 35*b* provided in the rib 35*a* allows air to flow in a lower section of the pellet container 5. In this manner, the dried resin pellets are sucked in and taken out more efficiently. The taken-out resin pellets in a dried state are, for example, temporarily stored in a stock hopper (not shown), or directly transferred to a raw material hopper of a resin molding machine and used as molding raw materials.

After the dried resin pellets are taken out as described above, the resin pellet supply mechanism 11 is moved to the opening section 23 in a similar manner as described above, and a predetermined amount of undried resin pellets are supplied and contained in the pellet container 5, from which the dried resin pellets are taken out. Then, the opening section 23 is closed with the lid 43, and the resin pellets are heated and dried in a decompressed state in a similar manner as described above.

In addition, when a molded product molded by the resin molding machine is changed, resin pellets to be dried need to be changed. In this case, resin pellets used for the previous molded product that remain in the inside of the pellet containers 5 need to be removed completely. In the present example, the top plate 7*a* of the drying box 7 is dismounted, and then the pellet containers 5 are taken out from the drying box 7. Next, the suction tube 35 is pulled out upwardly and taken out from each of the pellet containers 5. Then, resin pellets attached in the inside of the pellet containers 5 and the suction tube 35 can be vacuum-sucked and removed. (Refer to FIG. 10)

According to the present example, a small amount of dried resin pellets can be supplied at short period of time, and in this manner the dried resin pellets can be reliably supplied to the resin molding machine. In addition, when a molded product is to be changed, changeover can be carried out by taking out the suction tube 35 from each of the pellet containers 5 and removing remaining resin pellets easily and efficiently.

Second Example

FIG. 11 shows a plan explanatory view showing an outline of the drying box. FIG. 11 illustrates only the drying box and the pellet container. Although the resin pellet drying device according to a second example is provided with the lid mounting mechanism 9, the resin pellet supply mechanism 11, the resin pellet suction/take-out mechanism 13, and the exhaust gas mechanism as similar to the first example, detailed description relating to these members, mechanisms, and the like is omitted, since these members, mechanisms, and the like are the same as those in the first example.

As shown in FIG. 11, a drying box 101 is mounted on a main frame (not shown) of the resin pellet drying device according to the second example. The drying box 101 has a bottom surface, has an opening section 105 that has size corresponding to size of an opening on a top end of a pellet container 103 described later on part of a top plate, and is formed in a cylindrical shape with a required height. A sheet heating member 107, such as an electric heater, is entirely mounted on an inner peripheral, an outer peripheral, and a bottom surfaces of the drying box 101.

In addition, a rotational body 109 having an axis line in a vertical direction is supported in a rotatable manner on a center section of the drying box 101 in an airtight state The rotational body 109 is intermittently rotated by a rotational angle corresponding to one of the pellet containers 103 described later by a connected moving member (not shown), such as an electric motor and an air motor.

A plurality of supporting plates 109*a* that are engaged with part of the pellet containers 103 are provided on an outer peripheral surface of the rotational body 109 in a manner extending in radial directions. A sheet heating member 111, such as an electric heater, is mounted on each surface of the supporting plates 109*a*. Also, a plurality of the pellet containers 103 are provided in a circumferential direction in a space section between an inner peripheral surface of the drying box 101 and an outer peripheral surface of the rotational body 109 in a manner that inner peripheral sides of the pellet containers 103 are engaged between the supporting plates 109a and movable in a circumferential direction.

Each of the pellet containers 103 is almost equal to the drying box 101 in height, has a fan shape corresponding to an angle between the supporting plates 109a in the plan view, and has a hollow section with an open top end. Then, a suction tube 113 is mounted on a center section of the hollow section of each of the pellet containers 103, so that there is a small gap between a bottom end of the suction tube 113 and a bottom surface of the pellet containers 103 and a top end of the suction tube 113 is leveled with a top end of the pellet containers 103. The suction tube 113 is detachably mounted in a manner that a protruding section 113a extending in a radial direction on an outer periphery of the suction tube 113 is engaged with a concave section 103a formed on an inner surface of the pellet containers 103, as similar to the suction tube 35 in the first example.

A heat insulating material (not shown) is mounted on a peripheral surface and a bottom surface of the drying box 101, as similar to the first example. In addition, a suction hole (not shown) that communicates with atmospheric air and allows air to flow into the inside is formed on part of the drying box 101, and also the exhaust gas mechanism is connected to part of the drying box 101. In this manner, a required decompressed state is formed by allowing air to flow into the inside while exhausting air.

In the first example, the pellet containers 5 contained in the drying box 7 are moved in a circulating manner in a state where space for one pellet container 5 in the drying box 7 is left unoccupied. In contrast, in the second example, a plurality of the pellet containers 103 are contained in an entire space section of the drying box 101 in a manner adjacent to each other, and the pellet containers 103 are sequentially moved to the opening section 105 in accordance with intermittent rotation of the rotational body 109. In this manner, undried resin pellets can be supplied and dried resin pellets can be sucked and taken out.

In the above description, a plurality of the contained pellet containers 5 are taken out in a state where the top plate 7a is dismounted from the drying box 7, and then remaining resin pellets attached to the pellet containers 5 and the inside of the drying box 7 can be removed. However, the configuration may be such that the top plate 7a of the drying box 7 is formed in an integral manner, and the opening section 23 formed on the top plate 7a is in a rectangular shape when viewed from above and larger than a top section of the pellet containers 5, and the pellet containers 5 can be directly taken out from the opening section 23.

In the above description, the pellet containers 5 have a square tube shape having a square shape when viewed from above, and the suction tube 35 is provided in a center section of each of the pellet containers 5. However, the configuration may be such that the pellet containers 5 have a rectangular tube shape having a rectangular shape when viewed from above, and the suction tube is provided on one side of the hollow section of each of the pellet containers 5. In this case, undried resin pellets can be easily and efficiently supplied by positioning a nozzle of the pellet supply mechanism at a portion of one pellet container 5 except the suction tube without providing a baffle plate in the nozzle.

What is claimed is:

1. A synthetic resin pellet drying device, comprising:
a plurality of pellet containers that have a required length in a vertical direction, have a hollow section with a bottom surface, and contain a predetermined amount of synthetic resin pellets;
a drying box that can contain the plurality of pellet containers in a state where the pellet containers are adjacent to each other and supported in a movable manner, has a heating member provided at least on an inner surface, has a suction hole that communicates with atmospheric air and allows air to flow into the inside, and has an opening section that is leveled with a top end of the pellet containers on part of a top plate;
a moving member that sequentially moves the pellet containers contained in the drying box so as to circulate the pellet containers;
exhausting means for exhausting air in the drying box to form a required decompressed state;
a lid that opens and closes the opening section on the top plate of the drying box;
pellet supplying means for supplying undried synthetic resin pellets in the pellet container through the opened opening section; and
pellet take-out means for taking out synthetic resin pellets in a dried state that are contained in the pellet container through the opened opening section.

2. The synthetic resin pellet drying device according to claim 1, wherein
each of the pellet containers has an open end face, a rectangular tube shape with a bottom surface, and a suction tube that is detachably mounted in a center section of the pellet container in a manner that a top end of the suction tube is leveled with a top end of the pellet container and a small gap is provided between a bottom end of the suction tube and the bottom surface of the pellet container.

3. The synthetic resin pellet drying device according to claim 2, wherein
the pellet supplying means has a supply end thereof made in contact with or in the vicinity of an opening section on a top end of the pellet container excluding a top end of the suction tube, and
the pellet take-out means has a taking-out end thereof made in contact with the top end of the suction tube.

4. The synthetic resin pellet drying device according to claim 1, wherein
the drying box has a box shape that contains the pellet containers that are arranged in a plurality of columns and rows in a manner adjacent to each other by providing a space section of size of the one pellet container, and
the pellet container has a top surface thereof opened and has a rectangular tube shape with a bottom surface.

5. The synthetic resin pellet drying device according to claim 4, wherein
the moving member is provided on each corner of the drying box, and
the pellet container positioned in each corner is selectively moved in any of a column direction and a row direction, so that the pellet containers contained in the drying box can be moved in a circulating manner.

6. The synthetic resin pellet drying device according to claim 1, wherein
the drying box has a cylindrical shape with a bottom surface, and an opening section on part of a top plate, and
the pellet containers are contained in a state where the pellet containers are arranged adjacent to each other along an inner surface of the drying box, and in a manner that the pellet containers can be sequentially moved by the moving member provided in a center section of the drying box.

* * * * *